(12) United States Patent
Dilorenzo et al.

(10) Patent No.: US 9,183,659 B2
(45) Date of Patent: Nov. 10, 2015

(54) SEARCH-BASED MATCHING FOR MULTIPLE PARAMETER SETS

(71) Applicant: DreamWorks Animation LLC, Glendale, CA (US)

(72) Inventors: Paul Carmen Dilorenzo, Glendale, CA (US); Alexander P. Powell, Glendale, CA (US); Satheesh Subramanian, Glendale, CA (US)

(73) Assignee: DreamWorks Animation LLC, Glendale, CA (US)

( * ) Notice: Subject to any disclaimer, the term of this patent is extended or adjusted under 35 U.S.C. 154(b) by 300 days.

(21) Appl. No.: 13/843,600

(22) Filed: Mar. 15, 2013

(65) Prior Publication Data

US 2014/0267251 A1 Sep. 18, 2014

(51) Int. Cl.
*G06T 17/00* (2006.01)
*G06T 13/20* (2011.01)

(52) U.S. Cl.
CPC ..................................... *G06T 13/20* (2013.01)

(58) Field of Classification Search
CPC ................................ G06T 17/20; G06T 19/00
USPC .......................................................... 345/420
See application file for complete search history.

(56) References Cited

U.S. PATENT DOCUMENTS

| | | | | |
|---|---|---|---|---|
| 5,889,528 | A * | 3/1999 | Zhao | 345/648 |
| 6,088,042 | A * | 7/2000 | Handelman et al. | 345/473 |
| 8,115,774 | B2 | 2/2012 | Biehn et al. | |
| 8,334,872 | B2 | 12/2012 | Epps et al. | |
| 8,373,704 | B1 | 2/2013 | Mueller | |
| 2005/0253847 | A1 * | 11/2005 | Grassia et al. | 345/473 |
| 2007/0146371 | A1 * | 6/2007 | Dariush | 345/474 |
| 2011/0267358 | A1 * | 11/2011 | Rennuit et al. | 345/474 |
| 2012/0019517 | A1 * | 1/2012 | Corazza et al. | 345/419 |

FOREIGN PATENT DOCUMENTS

EP 1918881 A2 5/2008

OTHER PUBLICATIONS

Z. Bhatti, A. Shah, F. Shahidi, M. Karbasi, "Forward and Inverse Kinematics Seamless Matching Using Jacobian", Sindh Univ. Res. Jour. (Sci. Ser.) vol. 45 (2) 387-392 (Mar. 11, 2013).*
S.N. Cubero, "Blind search inverse kinematics for controlling all types of serial-link robot arms", Mechatronics and Machine Vision in Practice, Springer Berlin Heidelberg, 2008.*

(Continued)

*Primary Examiner* — Devona Faulk
*Assistant Examiner* — Jin Ge
(74) *Attorney, Agent, or Firm* — Morrison & Foerster LLP

(57) ABSTRACT

Search-based matching for multiple parameter sets in computer animation is disclosed. The search-based matching method can include receiving a selection of a first set of joint parameters in a first model to match to a second set of joint parameters in a second model, currently in operation, for an appendage of a computer-generated object. The method can also adjust the selected first set of joint parameters to match the second set of joint parameters. The method can further compare the adjusted first set of joint parameters to the second set of joint parameters. Based on the comparison, the method can switch from the second model to the first model and replace the second set of joint parameters with the adjusted first set of joint parameters. The method can then output the replacement first set of joint parameters for rendering the appendage of the object.

19 Claims, 6 Drawing Sheets

(56) References Cited

OTHER PUBLICATIONS

Boulic R, Thalmann D. Combined direct and inverse kinematic control for articulated Pgure motion editing. Computer Graphics Forum 1992:2(4).*

Kinematic Chain, John Mcdonald, Rosalee Wolfe, Karen Alkoby, Jaceck Brzezinski, Roymieco Carter, Mary Jo Davidson, Jacob Furst, Damien Hinkle, Bret Kroll, Glenn Lancaster, Lori Smallwood, Jorge Toro, Nedjla Ougouag, "Achieving Consistency in a Combined IK/FK Interface for a Seven Degree-of-Freedom Kinematic Chain", WSCG'2005.*

J. Wang, B. Bodenheimer, An evaluation of a cost metric for selecting transitions between motion segments, in: SIGGRAPH Symposium on Computer Animation, 2003.*

Edsall, Jerry, "Animation Blending: Achieving Inverse Kinematics and More", available online at <http://www.gamasutra.com/view/feature/131863/animation_blending_achieving_.php?print=1>, retrieved online at Apr. 30, 2013, 14 pages.

Extended European Search Report Received for EP Patent Application No. 14160111.2, mailed on Oct. 13, 2014, 8 pages.

"Arm Rig Setup for Seamless FK/IK Switching", Available online at <http://seithcg.com/wordpress/?page_id=30>, retrieved on Aug. 28, 2014, pp. 2-6.

Bhatti et al., "Forward and Inverse Kinematics Seamless Matching Using Jacobian", SI NDH University Research Journal (Science Series), Sindh Univ. Res. Jour. (Sci. Ser.), vol. 45, No. 2, 2013, pp. 387-392.

Cgsatya: "Animation Tutorial How to Switch Between Ik to Fk/Fk to Ik Switching While Animating", Available online at < https://www.youtube.com/watch?v=uTUYnNjGb1k>, retrieved on Sep. 3, 2011, 1 page.

Letterbanks, "Creating an IK/ FK Snapping Script for a Character Rig in Maya", Available online at <http://lesterbanks.com/2012/07/creating-an-ik-fk-snapping-script-for-a-character-rig-in-maya/>, retrieved on Aug. 26, 2014, 2 pages.

* cited by examiner

SEARCH-BASED MATCHING FOR MULTIPLE PARAMETER SETS

BACKGROUND

1. Field

The present disclosure relates to computer-generated animation and, more specifically, to performing search-based matching of multiple parameter sets to define an object's position and/or rotation in computer-generated animation.

2. Related Art

A computer-generated animation can include a series of computer-generated images in which one or more computer-generated objects are rendered at various positions and/or poses that change between images to mimic object movement. An appendage object, e.g., an arm, a leg, a tail, a foot, a hand, and the like, can be particularly challenging to create realistic positions and/or poses because the appendage's joints have several degrees of freedom to manipulate. As a result, users have generally applied forward and inverse kinematics to model and create the appendage's movements.

Forward kinematics (FK) can define what the exact location and/or rotation of each appendage joint should be. FK can generally be used to set a particular pose of the appendage. Inverse kinematics (IK) can define a goal or destination of the appendage, e.g., the appendage should touch another object, and then calculate the location and/or rotation required for each appendage joint to reach that goal or destination. IK can generally be used to set a particular goal for the appendage.

Often, users need to switch between FK and IK during the course of the animation to position and/or pose the appendage. However, because FK and IK define different locations and/or rotations for the same appendage joint, a switch between them can result in an abrupt change in the joint's location and/or rotation that is visually unrealistic. As a result, users have developed algorithms to match the FK and IK locations and/or rotations just prior to the switch so that the switch is visually smooth.

However, because appendages are different, each appendage type requires a specific matching algorithm. For example, an arm requires an arm matching algorithm; a leg, a leg matching algorithm; a tail, a tail matching algorithm; and so on. This has resulted in a large number and variety of matching algorithms. Moreover, maintaining such a large number can be time and labor intensive. Furthermore, a user has to understand each matching algorithm, the associated appendage type, and which degrees of freedom to manipulate in that algorithm in order to match FK and IK.

Accordingly, there is a need to provide an effective way to match different types of appendages.

SUMMARY

Search-based matching for multiple parameter sets can be performed in computer animation to switch from a current animation model to a new animation model during the animation. In one embodiment, the search-based matching can include receiving a selection of a first set of joint parameters in a first model to match to a second set of joint parameters in a second model for an appendage of a computer-generated object. The method can adjust the selected first set of joint parameters to match the second set of joint parameters. The method can further compare the adjusted first set of joint parameters to the second set of joint parameters. Based on the comparison, the method can switch from the second model to the first model and replace the second set of joint parameters with the adjusted first set of joint parameters. The method can then output the replacement first set of joint parameters for rendering the appendage of the object. The method can further prioritize the set of joint parameters into stages and perform the matching in stages. In one example, FK parameters can be selected to match to IK parameters so as to switch from IK modeling to FK modeling of the appendage. In another example, IK parameters can be selected to match to FK parameters so as to switch from FK modeling to IK modeling of the appendage.

Several advantages can be realized with search-based matching for multiple parameter sets in computer animation. The matching details can be transparent to the user, acting as a "black box," such that the user need not know or understand the matching method in order to use it. The matching method can be applied to any arbitrary parameter sets, where the method selects a number of parameters among the sets, calculates the cost to zero, and outputs a number of adjusted parameters among the sets. The method can match the parameter sets efficiently by prioritizing the parameters to be matched so as to stage the matching. The method can also match the parameter sets effectively so that switching between models does not produce abrupt changes in the positions and/or poses of the appendages.

BRIEF DESCRIPTION OF THE FIGURES

The present application can be best understood by reference to the following description taken in conjunction with the accompanying drawing figures, in which like parts may be referred to by like numerals.

DETAILED DESCRIPTION

Figure 1A:
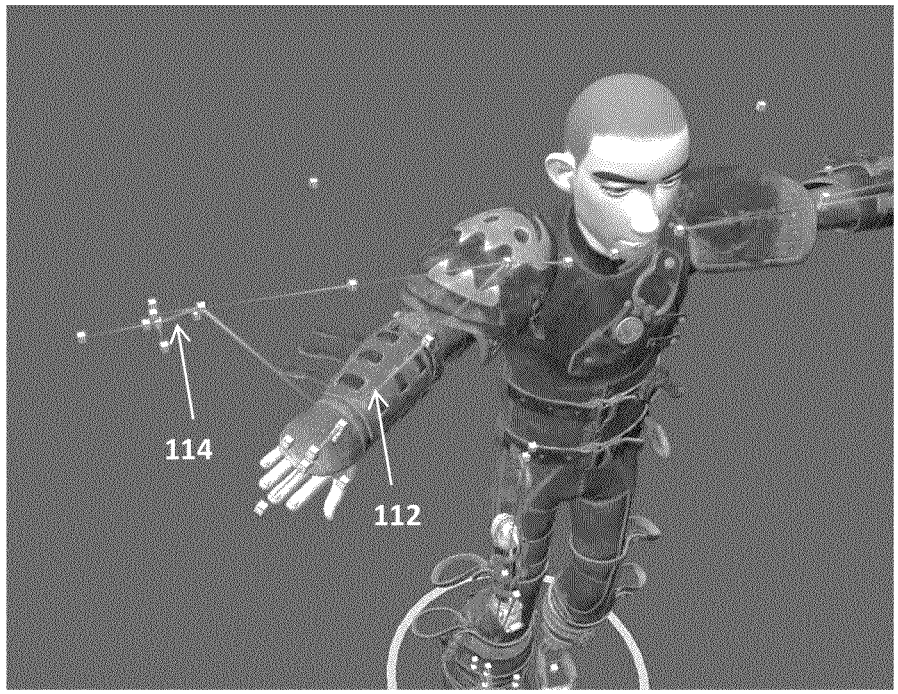
FIGS. 1A through 1D illustrate an exemplary series of images from an animation that result from performing search-based matching of multiple parameter sets to define a computer-generated object's location and rotation.

The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the present technology. Thus, the disclosed technology is not intended to be limited to the examples described herein and shown, but is to be accorded the scope consistent with the claims.

This relates to search-based matching for multiple parameter sets in computer animation. The matching can be performed to smoothly switch from a current animation model to a new animation model during the animation. A method to perform the search-based matching can include receiving a selection of a first set of joint parameters in a first model to match to a second set of joint parameters in a second model for an appendage of a computer-generated object. The method can adjust the selected first set of joint parameters to match the second set of joint parameters. The method can further compare the adjusted first set of joint parameters to the second set of joint parameters. Based on the comparison, the method can switch from the second model to the first model and replace the second set of joint parameters with the adjusted first set of joint parameters. The method can then output the replacement first set of joint parameters for rendering the appendage of the object. The method can further prioritize the set of joint parameters into stages and perform the matching in stages.

In one example, FK parameters in an FK model can be selected to match to IK parameters in an IK model so as to switch from IK modeling to FK modeling of the appendage. In another example, IK parameters in the IK model can be selected to match to FK parameters in the FK model so as to switch from FK modeling to IK modeling of the appendage.

Several advantages can be realized with search-based matching for multiple parameter sets in computer animation. First, the matching details can be transparent to the user, acting as a "black box," such that the user need not know or understand the matching method in order to use it. Second, the matching method can be applied to any arbitrary parameter sets, where the method selects a number of parameters among the sets, calculates the cost to zero, and outputs a number of adjusted parameters among the sets. Third, the method can match the parameter sets efficiently by prioritizing the parameters to be matched so as to stage the matching. Fourth, the method can match the parameter sets effectively so that switching between models does not produce abrupt changes in the positions and/or poses of the appendages.

It should be understood that, although the description describes search-based matching of appendages, the matching can be applied to any computer-generated object having multiple manipulable degrees of freedom, such as tree branches, strips of fabric, hair, and the like.

Figure 1B:
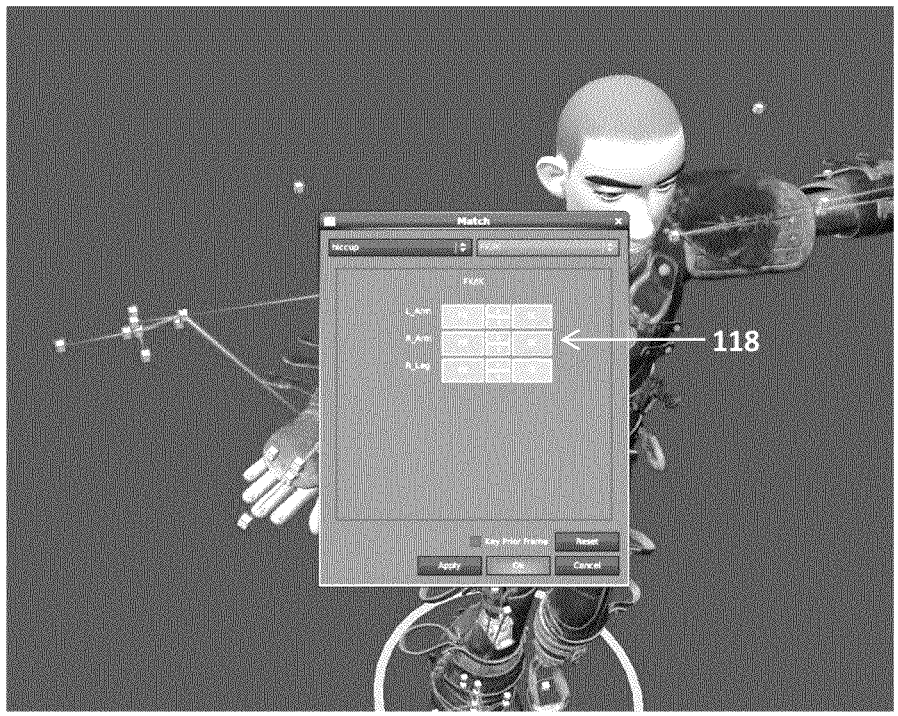
Figure 1C:
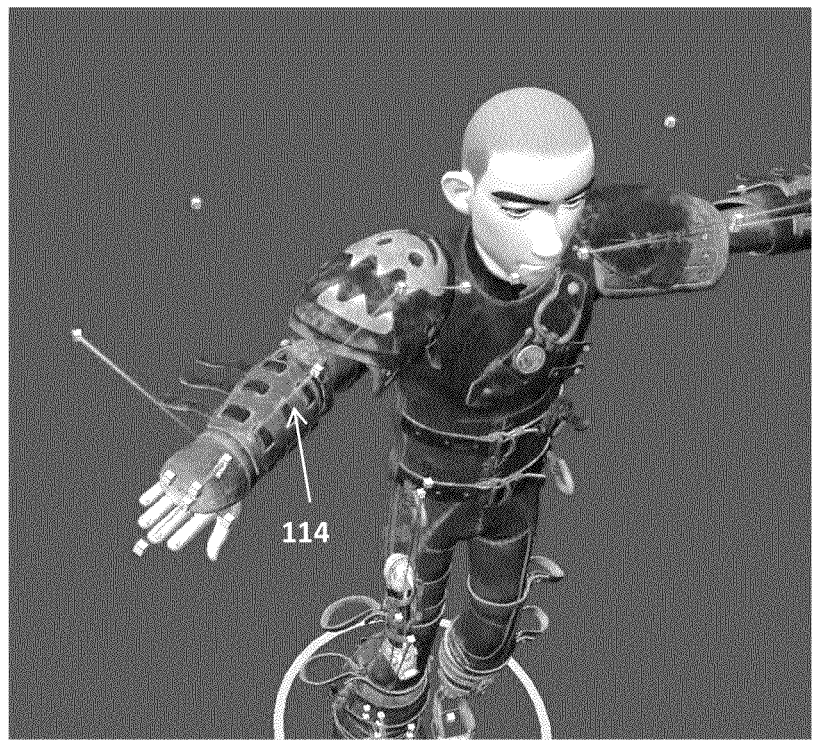
Figure 1D:
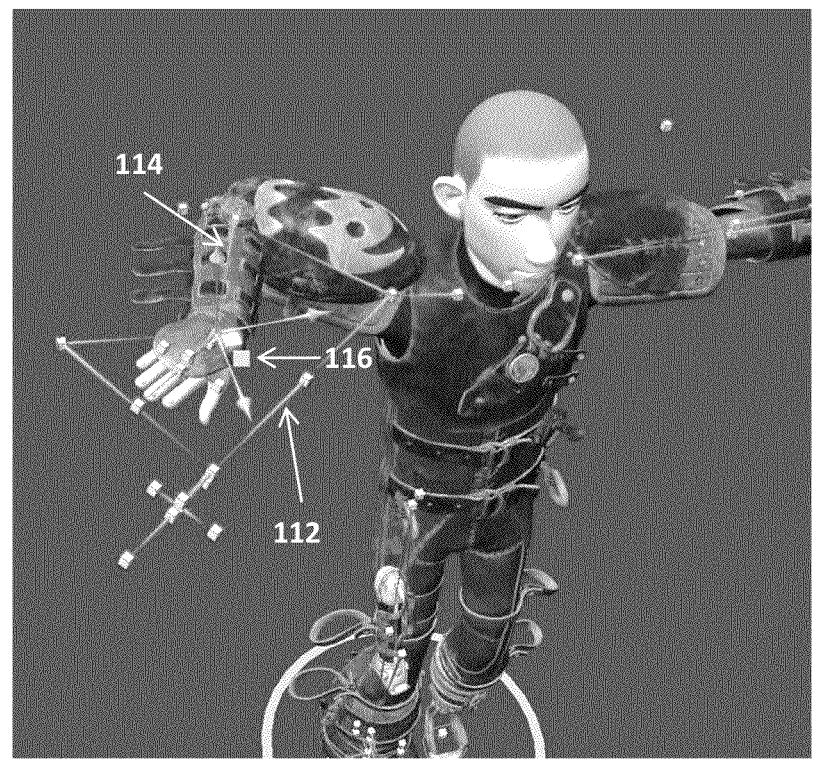

FIGS. 1A through 1D illustrate an exemplary series of images from an animation rendered using the method for performing search-based matching of multiple parameter sets as described in detail below. FIG. 1A illustrates a computer-generated image operating in FK mode, in which the joints of the character's right arm are defined and controlled by the joints' rotation and location. In FIG. 1A, the FK joints and associated parameters are depicted by the blocks on line 112 (drawn along the character's extended right arm); whereas, the unused IK joints and associated parameters are depicted by the blocks on line 114 (drawn behind and at an angle to the character's extended right arm). FIG. 1B illustrates a computer interface for the search-based matching that allows a user to switch from FK mode to IK mode for the character's right arm in FIG. 1A. In FIG. 1B, the character's right arm "R_Arm" 118 is selected for switching and the right arrow "▶" is set to indicate that the switch is from "FK" to "IK." Note that the reverse switch (from "IK" to "FK") can be done by selecting the left arrow "◀". The "OK" button is selected to perform the search-based matching followed by the switch. FIG. 1C illustrates the computer-generated image of FIG. 1A now switched to IK mode, in which the IK joints and associated parameters of the character's right arm have been matched to the FK joints and associated parameters. In FIG. 1C, the IK joints, depicted by the blocks on the line 114 (drawn along the character's extended right arm), overlay the FK joints, no longer visible as the blocks on the line 112. FIG. 1D illustrates the computer-generated image of FIG. 1A now operating in IK mode, in which the joints of the character's right arm are defined and controlled by a goal to move the hand to a particular location. In FIG. 1D, the hand's IK goal is depicted by block 116 at the hand and the arm's IK joints calculated to realize that goal are depicted by the blocks on the line 114 (drawn along the character's bent right arm). The now unused FK joints and associated parameters are depicted by the blocks on the line 112 (drawn in front of and at an angle to the character's bent right arm), in their last known location and rotation.

In operation, a user can start in FK mode, as illustrated in FIG. 1A. The user can then request a switch from FK mode to IK mode, as illustrated in FIG. 1B, by selecting the appendage, i.e., the character's right arm, on which to perform the switch and then executing the search-based matching on the selected appendage. The search-based matching can then adjust the IK joint parameters until they match the FK parameters, as illustrated in FIG. 1C, and then switch to IK mode without any abrupt changes in the image. In IK mode, the user can define the appendage's goal and control it accordingly, as illustrated in FIG. 1D.

Figure 2:
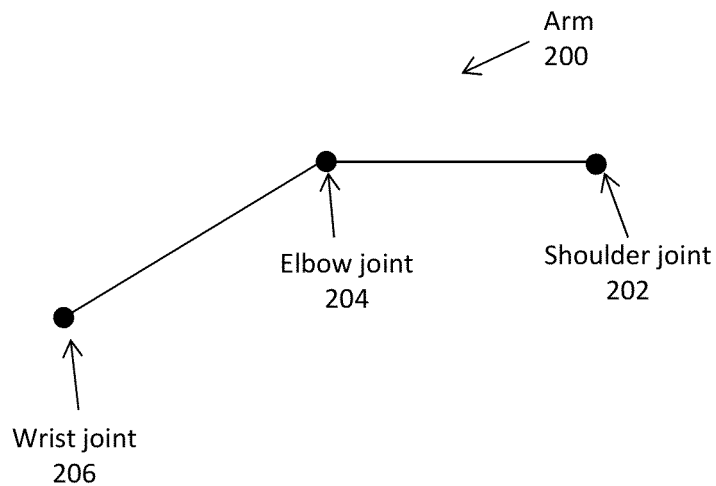
FIG. 2 illustrates an exemplary arm schematic having multiple joint parameter sets on which to perform search-based matching to define the arm's location and rotation.

FIG. 2 illustrates an exemplary schematic of an appendage, i.e., an arm, having joints on which to perform search-based matching to define the arm's location and rotation. In FIG. 2, computer-generated arm 200 can have shoulder joint 202, elbow joint 204, and wrist joint 206, which can each be manipulated to move the arm into a particular pose or position in an image.

Figure 3:
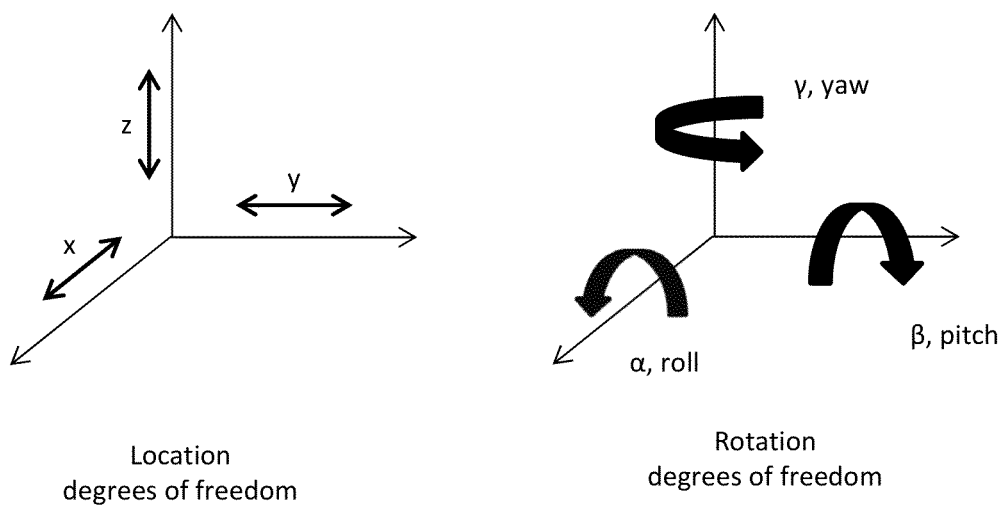
FIG. 3 illustrates exemplary joint parameters that can be adjusted during search-based matching to define the joint's location and rotation.

Each joint 202, 204, 206 can have several manipulable parameters (or degrees of freedom), as illustrated in FIG. 3. In FIG. 3, the manipulable joint parameters can include location parameters: forward-backward movement, x; side-to-side movement, y; and up-and-down movement, z. The joint parameters can further include rotation parameters: roll, $\alpha$; pitch, $\beta$; and yaw, $\gamma$. The parameters can be manipulated individually or in combination, depending on the desired arm pose or position in the image.

Search-based matching can be used to search for a match between one set of parameters and another set by making incremental adjustment to the one set until it matches the other. As such, when a switch is made between FK and IK, the two sets of parameters match, thereby eliminating any abrupt changes during the switch.

Figure 4:
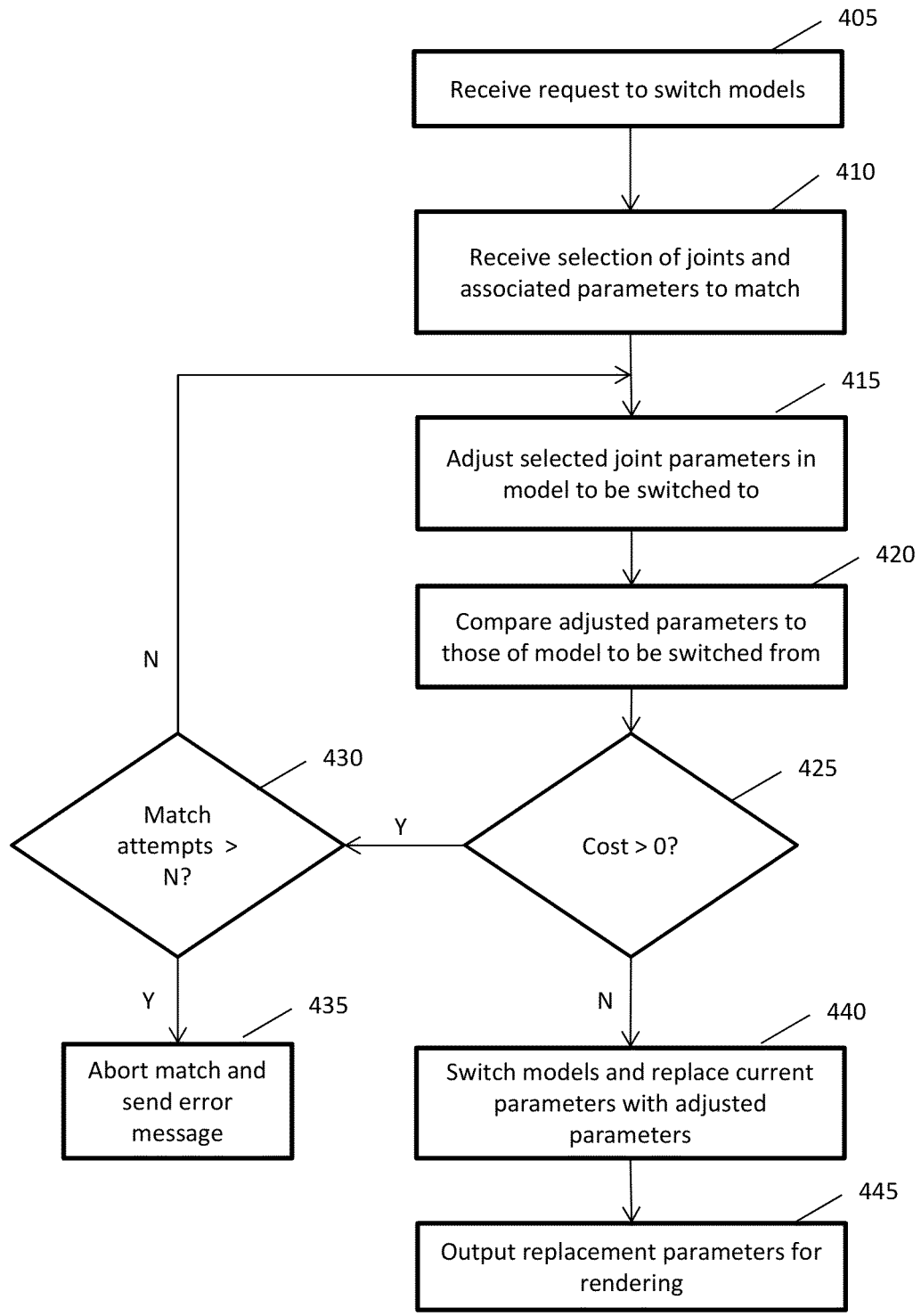
FIG. 4 illustrates an exemplary method for performing search-based matching for multiple parameter sets to define a computer-generated object's location and rotation.

FIG. 4 illustrates an exemplary method for performing search-based matching between FK and IK joint parameters to define an appendage's location and rotation in an image. In FIG. 4, the method can receive a request to switch between FK and IK so as to model and create an appendage's new location and/or rotation (405). In some examples, the request can be received from a user. In some examples, the request can be received from another algorithm. The method can further receive a selection of the appendage joints and associated location and/or rotation parameters that need to be matched to the current parameters prior to making the switch (410). For example, a shoulder joint and its associated roll and pitch parameters can be selected for matching. In some examples, the selection can be received based on a user's input. In some examples, the selection can be received based on another algorithm's input.

For the joint parameters in the model to be switched to ("the switching parameters"), the method can adjust the switching parameters to match the joint parameters of the model in current operation ("the current parameters") (415). The method can compare the adjusted switching parameters to the current parameters (420). A cost function can be used to calculate the differences between the adjusted switching parameters and the current parameters and then to calculate a cost based on the differences. The method can determine whether the cost is greater than zero (425). A cost greater than zero can indicate that the two sets of parameters do not match; whereas, a cost at zero can indicate a match. In some cases, a suitable minimum rather than zero can be used. If the cost is greater than zero (425), the method can determine whether the unsuccessful matching attempts exceed a predetermined maximum N (430).

If the attempted matches have not reached the maximum number N (430), the method can repeat the switching parameters' adjustments (415) and the comparison between the adjusted switching parameters and the current parameters (420) until the cost reaches zero (425). However, if the attempts reach the maximum number N before the cost reaches zero (430), the method will abort and send an error message that the switching parameters could not be adjusted to match the current parameters, such that the switch should not be performed (435).

However, if the cost does reach zero, indicating the adjusted switching parameters match the current parameters (425), the method can perform the switch between FK and IK, thereby replacing the current parameters with the adjusted switching parameters (440). The method can output the replacement switching parameters for rendering the appendage (445).

In addition to determining whether to abort based on number of attempted matches, the method can determine whether to abort based on matching time. For example, if the cost does not reach zero after an elapsed time T, the method can abort and send an error message that the match could not be made, such that the switch should not be performed.

In the case where FK replaces IK, the parameters selected for matching can include the joint rotation parameters, such that the FK rotation parameters ($\alpha$, $\beta$, $\gamma$) could be adjusted to match the corresponding IK rotation parameters. In the case where IK replaces FK, the parameters selected for matching can include the IK goal location parameters, such that the IK goal location parameters (x, y, z) could be adjusted to match the corresponding FK location parameters.

From the method's perspective, there is no difference between switching from FK to IK and vice versa or between any different types of appendages. Rather, the method receives any inputs, pushes cost to zero based on those inputs, and sends any outputs. This advantageously provides a generic algorithm transparent to the user.

Figure 5:
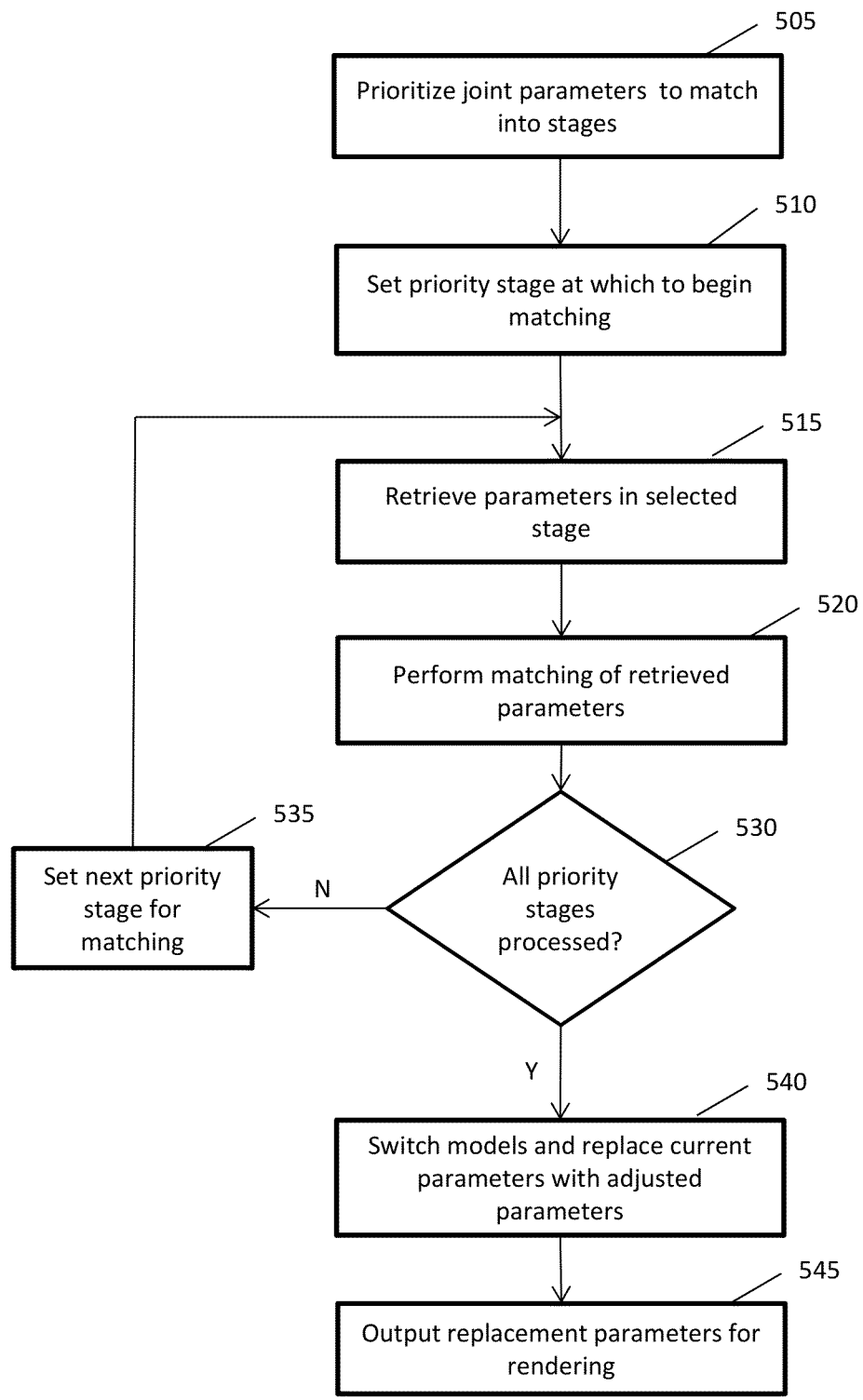
FIG. 5 illustrates another exemplary method for performing search-based matching for multiple parameter sets to define a computer-generated object's location and rotation.

An appendage can have many joints and degrees of freedom to manipulate such that the matching all the joint parameters at once can be computationally expensive. FIG. 5 illustrates an exemplary method for prioritizing the parameters into stages and performing the matching by stages. In some examples, the more important parameters can be in first stages and lesser important parameters can be in later stages. As a result, matching can be more manageable and computationally less expensive.

In FIG. 5, the method can prioritize the appendage joint parameters to match in stages (505). In some examples, the parameters can be prioritized according to match importance, where the more important parameters to match can be assigned a higher priority and placed in first stages, while the less important parameters to match can be assigned a lower priority and placed in later stages. In some examples, the parameters can be prioritized according to joint location, where end joints can be assigned a higher priority and placed in first stages, while middle joints can be assigned a lower priority and placed in later stages. In some examples, the parameters can be prioritized according to joint complexity, where less complex joints can be assigned a higher priority and place in first stages for quick matching, while more complex joints can be assigned a lower priority and placed in later stages, or vice versa. Any suitable criteria can be used to prioritize the parameters depending on the needs of the user. It should be noted that the prioritizing can be done pre-operation and the stages stored for later use.

The method can set the priority stage at which to begin matching (510). In most cases, the method will set the first priority stage. The method can then retrieve the parameters in the stage corresponding to the selected priority from storage (515) and perform matching on these parameters, as described in FIG. 4, for example (520). The method can determine whether all the stages have been matched or processed (530). If all the stages have not been matched or processed (530), the method will repeat the matching (515, 520) until all the stages of parameters have been completed. In some examples, if the parameters in a stage cannot be matched, the method can skip that stage and proceed to another stage for matching. In some examples, if the parameters cannot be matched, the method can abort and send an error message that the match could not be made, such that a switch between FK and IK should not be performed.

If all the stages have been matched or processed (530), the method can perform the switch between FK and IK, thereby replacing the current parameters with the adjusted switching parameters (540). The method can output the replacement adjusted parameters for rendering the appendage (545).

It should be understood that the methods of FIGS. 4 and 5 are not limited to those illustrated herein, but can include other and/or additional steps for performing search-based matching of appendages.

The methods of FIGS. 4 and 5 can be implemented in various animation implementations. In one implementation, as described above, the methods can be used to match appendage location and/or rotation parameters in FK to those in IK or vice versa.

In another implementation, the methods can be used to match appendage local coordinates and global coordinates. A user can use IK to create poses for an appendage, e.g., an octopus tentacle, in which there are several IK goals to be reached. The poses can be saved in a pose library for later use. The appendage's joint parameters in the poses can be defined in global coordinates, i.e., relative to the origin (0, 0, 0) in an image, such that the IK goals are also. However, when the user wants to retrieve a pose from the pose library and use it at a different position in the image than the origin, the appendage can undesirably snap back to the origin because that is how the IK goals were defined. Accordingly, the methods of FIGS. 4 and 5 can be used to match the pose's global coordinates to the pose's local coordinates, i.e., the different position in the image, and then switch to the local coordinates to render that local pose.

In still another implementation, the methods can be used to match appendages between different animation spaces. In animation, space can be defined as all space, which is global space; local to character space, which is space with an origin in the computer-generated character's body; and local to head space, which is space with an origin in the character's neck. The methods of FIGS. 4 and 5 can be used to match an appendage between spaces prior to switching between those spaces.

Figure 6:
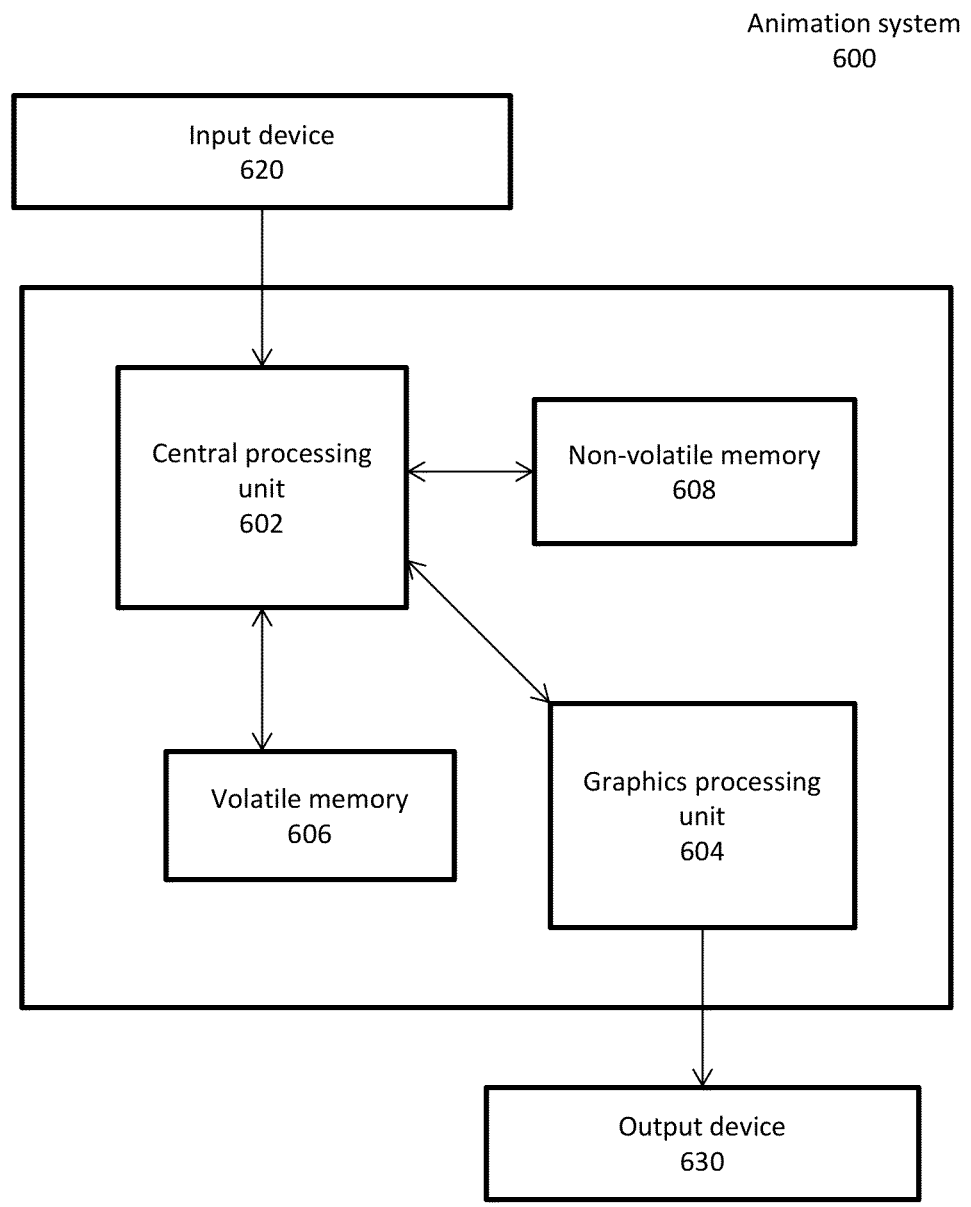
FIG. 6 illustrates an exemplary animation system that performs search-based matching of multiple parameter sets to define a computer-generated object's location and rotation.

FIG. 6 illustrates an exemplary animation system 600 that can be used to perform search-based matching of multiple parameter sets to define a computer-generated object's location and rotation, as described above. The search-based matching can be implemented, for example, in either hardware or in software stored on a non-transitory computer-readable storage medium. The system can be configured to match appendage joint parameters between FK and IK and prioritize the order in which the parameters are matched. The system can be further configured to receive input from a user and to display graphics, an image, or scene of an animation based on the search-based matching.

The animation system 600 can be configured to receive user input from an input device 620. The input device 620 can be any device that receives input from the user and transmits it to the animation system 600. For example, the input device can be a keyboard, a mouse, a tablet, a stylus, or the like. Those skilled in the art will recognize that other types of input devices can also be used.

The animation system 600 can be configured to output graphics, images, or scenes of an animation to a display device 630. The display device 630 can be any device that receives data from the animation system and presents it to the user. For example, the display device can be a liquid crystal display, a set of light emitting diodes, a projector, or the like. Those skilled in the art will recognize that other types of output devices can also be used.

The animation system 600 can comprise a central processing unit 602. The central processing unit can comprise one or more processing cores. The central processing unit 602 can be coupled to and able to communicate with the input device 620. Although the animation system 600 is illustrated with one central processing unit 602, the animation system 600 can have multiple processing units. The animation system 600 can also comprise a graphics processing unit 604. The graphics processing unit 604 can be dedicated to processing graphics related data. The graphics processing unit 604 can comprise a single processing core or multiple processing cores. Although the animation system 600 is illustrated with one graphics processing unit 604, the animation system 600 can have a plurality of graphics processing units. The central processing unit 602 and/or the graphics processing unit 604 can be coupled to and able to communicate data to the output device 630.

In one example, the animation system 600 can comprise one or more processors and instructions stored in a non-transitory computer readable storage medium, such as a memory or storage device, that when executed by the one or more processors, perform search-based matching, as described above. In the context of the embodiments described herein, a "non-transitory computer readable storage medium" can be any medium that can contain or store the program for use by or in connection with the instruction execution system, apparatus, or device. The non-transitory computer readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The animation system 600 can comprise volatile memory 606, which is a non-transitory computer readable storage medium, in communication with the central processing unit 602. The volatile memory 606 can be, for example, random access memory, such as dynamic random access memory or static random access memory, or any other type of volatile memory. The volatile memory 606 can be used to store data or instructions during the operation of the animation system 600. Those skilled in the art will recognize that other types of volatile memory can also be used.

The animation system 600 can also comprise non-volatile memory 608, which is a non-transitory computer readable storage medium, in communication with the central processing unit 602. The non-volatile memory 608 can include flash memory, hard disks, magnetic storage devices, read-only memory, or the like. The non-volatile memory 608 can be used to store animation data, render setup graph data, computer instructions, or any other information. Those skilled in the art will recognize that other types of non-volatile memory can also be used.

The animation system 600 is not limited to the devices, configurations, and functionalities described above. For example, although a single volatile memory 606, non-volatile memory 608, central processing unit 602, graphics processing unit 604, input device 620, and output device 630 are illustrated, a plurality of any of these devices can be implemented internal or external to the animation system 600. In addition, the animation system 600 can comprise a network access device for accessing information on a network, such as an internal network or the Internet. Those skilled in the art will recognize other configurations of the animation system 600 can be used.

Various exemplary embodiments are described herein. Reference is made to these examples in a non-limiting sense. They are provided to illustrate more broadly applicable aspects of the disclosed technology. Various changes can be made and equivalents can be substituted without departing from the true spirit and scope of the various embodiments. In addition, many modifications can be made to adapt a particular situation, material, composition of matter, process, process act(s) or step(s) to the objective(s), spirit or scope of the various embodiments. Further, as will be appreciated by those with skill in the art, each of the individual variations described and illustrated herein has discrete components and features which can be readily separated from or combined with the features of any of the other several embodiments without departing from the scope or spirit of the various embodiments.

What is claimed is:

1. A method for search-based matching for multiple parameter sets in computer animation, the method comprising:
   receiving a selection of a first set of joint parameters in a first model to match to a second set of joint parameters in a second model for an appendage of a computer generated object;
   receiving a request to switch between the first model that generated the first set of joint parameters and the second model that generated the second set of joint parameters;
   searching for a match between the first set of parameters and the second set of parameters, wherein the searching comprises:
   (a) incrementally adjusting the selected first set of joint parameters,
   (b) calculating a difference between the adjusted first set of joint parameters and the second set of joint parameters,
   (c) calculating a cost based on the difference, and
   (d) determining whether the cost is greater than a minimum; in accordance with a determination that the cost is greater than the minimum, re-executing steps (a)-(d); and in accordance with a determination that the cost is not greater than the minimum: replacing the second set of joint parameters with the adjusted first set of joint parameters, outputting the replacement first set of joint parameters for rendering the appendage of the object, and switching between the first model that generated the first set of joint parameters and the second model that generated the second set of joint parameters.

2. The method of claim 1, wherein receiving a selection of a first set of joint parameters comprises: receiving at least one joint location parameter, at least one joint rotation parameter, or both for the appendage.

3. The method of claim 1, wherein outputting the replacement first set of joint parameters comprises: outputting at least one joint location parameter, at least one joint rotation parameter, or both for the appendage to render the appendage.

4. The method of claim 1, wherein the minimum is zero.

5. The method of claim 1, further comprising: further in accordance with a determination that the cost is greater than the minimum: determining whether a number of attempted matches has exceeded a threshold value, wherein steps (a)-(d) are re-executed only if the number of attempted matches has not exceeded the threshold value, and incrementing the number of attempted matches.

6. The method of claim 1, further comprising: further in accordance with a determination that the cost is greater than the minimum, determining whether a matching time for iteratively executing steps (a)-(d) has exceeded a threshold elapsed time, wherein steps (a)-(d) are re-executed only if the matching time has not exceeded the threshold elapsed time.

7. A non-transitory computer-readable storage medium comprising computer-executable instructions for search-based matching for multiple parameter sets in computer animation, the computer-executable instructions comprising instructions for:

receiving a selection of a first set of joint parameters in a first model to match to a second set of joint parameters in a second model for an appendage of a computer-generated object;

receiving a request to switch between the first model that generated the first set of joint parameters and the second model that generated the second set of joint parameters;

searching for a match between the first set of parameters and the second set of parameters, wherein the searching comprises:
(a) incrementally adjusting the selected first set of joint parameters,
(b) calculating a difference between the adjusted first set of joint parameters and the second set of joint parameters,
(c) calculating a cost based on the difference, and
(d) determining whether the cost is greater than a minimum;

in accordance with a determination that the cost is greater than the minimum, re-executing steps (a)-(d); and in accordance with a determination that the cost is not greater than the minimum:

replacing the second set of joint parameters with the adjusted first set of joint parameters, outputting the replacement first set of joint parameters for rendering the appendage of the object, and switching between the first model that generated the first set of joint parameters and the second model that generated the second set of joint parameters.

8. The computer-readable storage medium of claim 7, wherein receiving a selection of a first set of joint parameters comprises: receiving at least one joint location parameter, at least one joint rotation parameter, or both for the appendage.

9. The computer-readable storage medium of claim 7, wherein outputting the replacement first set of joint parameters comprises: outputting at least one joint location parameter, at least one joint rotation parameter, or both for the appendage to render the appendage.

10. The non-transitory computer-readable storage medium of claim 7, wherein the minimum is zero.

11. The non-transitory computer-readable storage medium of claim 7, further comprising: further in accordance with a determination that the cost is greater than the minimum: determining whether a number of attempted matches has exceeded a threshold value, wherein steps (a)-(d) are re-executed only if the number of attempted matches has not exceeded the threshold value, and incrementing the number of attempted matches.

12. The non-transitory computer-readable storage medium of claim 7, further comprising: further in accordance with a determination that the cost is greater than the minimum, determining whether a matching time for iteratively executing steps (a)-(d) has exceeded a threshold elapsed time, wherein steps (a)-(d) are re-executed only if the matching time has not exceeded the threshold elapsed time.

13. An apparatus for search-based matching for multiple sets of parameters in computer animation, the apparatus comprising:

a memory configured to store data; and a computer processor configured to:

receive a selection of a first set of joint parameters in a first model to match to a second set of joint parameters in a second model for an appendage of a computer-generated object, receive a request to switch between the first model that generated the first set of joint parameters and the second model that generated the second set of joint parameters;

search for a match between the first set of parameters and the second set of parameters, wherein searching for a match comprises:
(a) incrementally adjusting the selected first set of joint parameters,
(b) calculating a difference between the adjusted first set of joint parameters and the second set of joint parameters,
(c) calculating a cost based on the difference, and
(d) determining whether the cost is greater than a minimum;

in accordance with a determination that the cost is greater than the minimum, re-execute steps (a)-(d); and in accordance with a determination that the cost is not greater than the minimum:

replace the second set of joint parameters with the adjusted first set of joint parameters, output the replacement first set of joint parameters for rendering the appendage of the object, and switch between the first model that generated the first set of joint parameters and the second model that generated the second set of joint parameters.

14. The apparatus of claim 13, wherein the computer processor configured to receive a selection of a first set of joint parameters: receives at least one joint location parameter, at least one joint rotation parameter, or both for the appendage.

15. The apparatus of claim 13, wherein the computer processor configured to output the replacement first set of joint parameters: outputs at least one joint location parameter, at least one joint rotation parameter, or both for the appendage to render the appendage.

16. A method for search-based matching for multiple parameter sets in computer animation, the method comprising:
- prioritizing a set of joint parameters into stages for matching, the set of joint parameters defining an appendage of a computer-generated object;
- setting one of the stages at which to begin matching;
- receiving a request to switch between a first model that generated a first set of joint parameters and a second model that generated a second set of joint parameters;
- searching for a match between the first set of joint parameters corresponding to the set of joint parameters in the selected stage and the second set of joint parameters corresponding to the set of joint parameters in the selected stage, wherein the searching comprises:
  - (a) incrementally adjusting the first set of joint parameters,
  - (b) calculating a difference between the adjusted first set of joint parameters and the second set of joint parameters,
  - (c) calculating a cost based on the difference, and
  - (d) determining whether the cost is greater than a minimum;
- in accordance with a determination that the cost is greater than the minimum, re-executing steps (a)-(d); and
- in accordance with a determination that the cost is not greater than the minimum, replacing the second set of joint parameters with the adjusted first set of joint parameters;
- repeating the searching for at least a predefined number of the stages; outputting matching results for rendering the appendage of the object; and
- switching between the first model that generated the first set of joint parameters and the second model that generated the second set of joint parameters.

17. The method of claim 16, wherein the minimum is zero.

18. The method of claim 16, further comprising: further in accordance with a determination that the cost is greater than the minimum: determining whether a number of attempted matches has exceeded a threshold value, wherein steps (a)-(d) are re-executed only if the number of attempted matches has not exceeded the threshold value, and incrementing the number of attempted matches.

19. The method of claim 16, further comprising: further in accordance with a determination that the cost is greater than the minimum, determining whether a matching time for iteratively executing steps (a)-(d) has exceeded a threshold elapsed time, wherein steps (a)-(d) are re-executed only if the matching time has not exceeded the threshold elapsed time.

* * * * *